Oct. 14, 1969   C. C. SCHOTT   3,472,502
STACK FURNACE WITH PUSHERS FOR FEEDING SCRAP MATERIAL
Filed June 7, 1968   2 Sheets-Sheet 1

INVENTOR.
CLARENCE C. SCHOTT
BY
Bacon & Thomas
ATTORNEYS

Oct. 14, 1969     C. C. SCHOTT     3,472,502

STACK FURNACE WITH PUSHERS FOR FEEDING SCRAP MATERIAL

Filed June 7, 1968     2 Sheets-Sheet 2

INVENTOR.
CLARENCE C. SCHOTT
BY
Bacon & Thomas
ATTORNEYS

United States Patent Office 3,472,502
Patented Oct. 14, 1969

3,472,502
STACK FURNACE WITH PUSHERS FOR FEEDING SCRAP MATERIAL
Clarence C. Schott, 1209 Havenwood Road, Baltimore, Md. 21218
Filed June 7, 1968, Ser. No. 735,452
Int. Cl. F27b 9/38, 1/20
U.S. Cl. 266—27                                                14 Claims

ABSTRACT OF THE DISCLOSURE

Scrap vehicles or similar materials to be melted continuously descend through the furnace stack and are supported while being melted on the water cooled support ledge of the furnace. A plurality of radially disposed, water cooled, pushers extend through the furnace wall and are selectively operable by hydraulic motors to reciprocate inwardly and outwardly immediately above the upper surface of the support ledge for removing unmelted scrap material lodged thereon and for assisting in feeding the scrap material disposed adjacent the upper surface of the support ledge inwardly thereof and to the furnace melting zone.

---

As scrap vehicles and like materials descend through the stack of a furnace such as the one disclosed in my Patent No. 3,367,769, portions disposed in the choke zone adjacent the furnace wall and above the support ledge come to rest on the ledge and may become hung up, thus creating a problem by obstructing the descent of scrap material located in the stack above and resting on or engaged by the hung-up material.

Another problem often encountered is that of maintaining the rate of melting and the rate of descent of the scrap vehicles into the melting zone of the furnace so related that the furnace will be operated at maximum efficiency. If the rate of descent of the scrap into the melting zone is too slow due to hang-ups or the angle or configuration of the support ledge, the rate at which the scrap is melted will be reduced. On the other hand, if the scrap descends too rapidly, into the melting zone, the flow of the hot combustion gases upwarly through the melting zone may thereby be obstructed and the rate of melting impeded.

This invention concerns improving the operating efficiency of a metal melting stack furnace and relates particularly to apparatus for removing portions of unmelted scrap vehicles or like material which become lodged or hung up on the support ledge of the furnace and for assisting in the feeding of the scrap material to the choke opening of the furnace for melting.

It is an object of this invention to provide apparatus for feeding scrap metal from adjacent the inner periphery of the furnace wall inwardly to the hot combustion gases in the melting zone.

Another object of the invention is to provide apparatus for pushing unmelted portions of scrap metal lodged in the choke zone or on the support ledge of the furnace inwardly to the melting zone adjacent the ledge opening.

A further object is to provide a plurality of independently operable, water cooled pushers around the support ledge to dislodge unmelted scrap hung up on the ledge and to feed unmelted scrap inwardly of the furnace wall and to the melting zone.

An additional object is to provide a plurality of scrap pushers which may be quickly and easily mounted in operative position on the furnace and which may be readily removed for repairs or replacement while the furnace is in operation.

It is also an object of this invention to provide apparatus of the type described which is economical to manufacture and which is of simple, rugged and durable construction.

These and other objects and advantages of this invention will become more apparent from the following specifications and claims which relate to preferred forms of the invention disclosed in the drawings wherein:

FIG. 4 is a fragmentary, horizontal, sectional view similar to FIG. 1 illustrating a modified form of pushing element; and FIG. 5 is a fragmentary, sectional, perspective view of a modification of the furnace showing triangular-shaped, pyramid-like elements for deflecting material into the path of the pushers.

Figure 1:
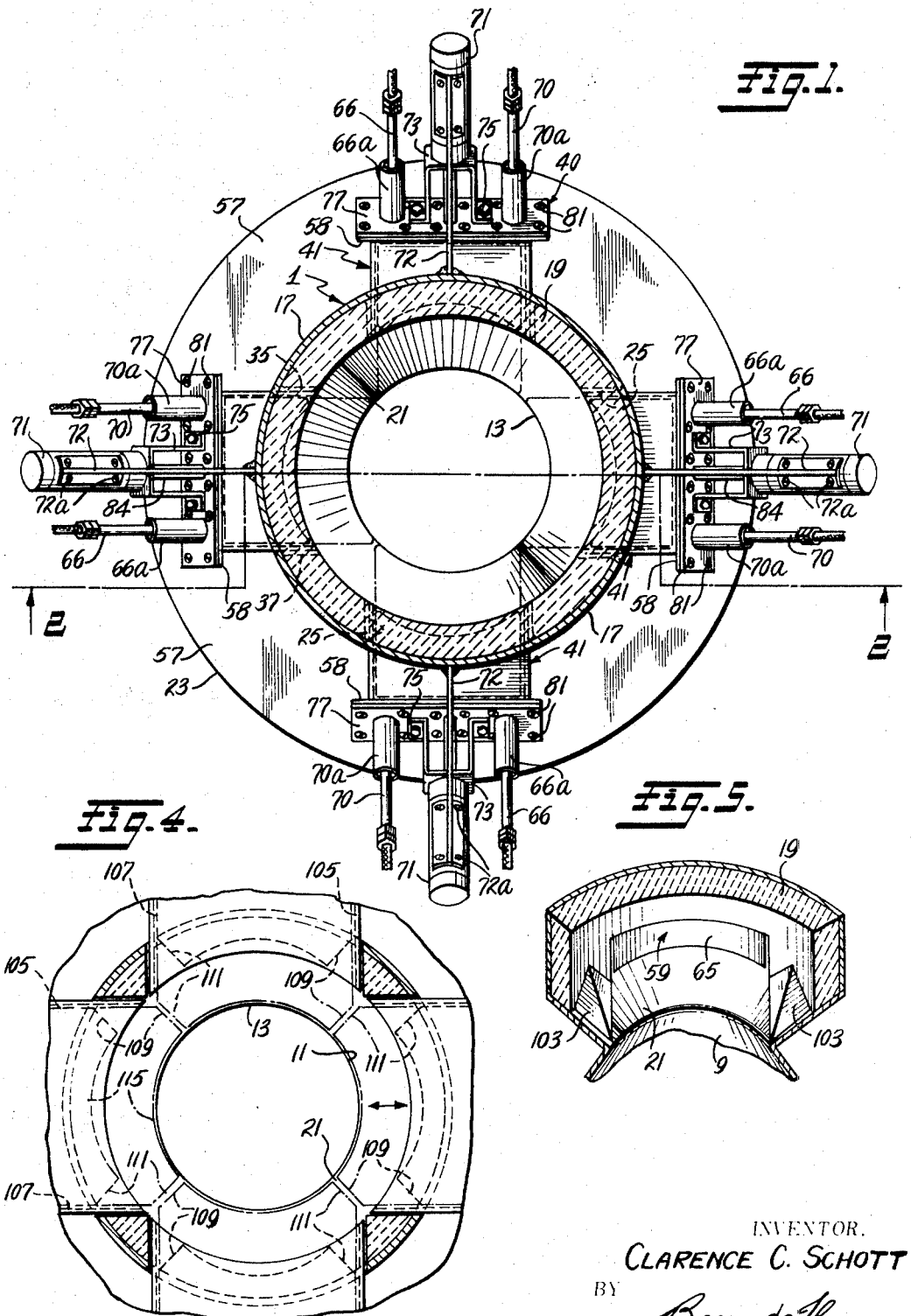
FIG. 1 is a horizontal, sectional view showing the arrangement of the material pusher elements in the choke zone of a stack-type furnace, taken on the line 1—1 of FIG. 2.

A stack furnace suitable for the melting of scrap vehicles and the manner in which scrap vehicles are continuously melted therein is disclosed in detail in my Patent No. 3,367,769 and reference should be made to this patent for a complete understanding of the method and apparatus for continuously melting scrap vehicles. In order to illustrate the present invention, the only parts of the stack furnace deemed necessary to be shown are the upper portion of the combustion chamber, the lower portion of the stack and the water-cooled support ledge since the remainder of the furnace may be substantially the same as the one disclosed in my patent mentioned above.

The portion of a stack furnace shown is designated by the reference numeral 1 and includes a generally cylindrical outer steel shell 3. The interior of the combustion chamber 5 is preferably cylindrical in shape and is lined with a suitable high temperature refractory insulation material or brick 7.

The upper portion of the wall of the combustion chamber 5 includes an inwardly and upwardly inclined steel wall section 9 which extends from the cylindrical wall 3 and terminates at an inner edge 11 to provide a restricted circular opening 13. The insulation 7 lining the wall section 9 is also inclined upwardly and inwardly and terminates a short distance outwardly from the edge 11, providing a circular opening 15 somewhat larger in diameter then the opening 13.

The steel shell surrounding the lower portion of the stack 17 is lined with suitable high temperature brick 19. As shown, a conically shaped, steel support shoulder or ledge 21 extends inwardly and downwardly from the lower end of the stack shell 13 to the edge 11 of the wall section 9 and is joined thereto as by welding, at the opening 13.

The metal support ledge 21 and wall section 9, which are formed of heat and wear resistant steel, are located at or near the hottest zone of the combustion chamber, the area of the furnace both below and above the opening 13 being generally referred to as the melting or combustion zone. The ledge 21 and wall section 9, provide an offset or choke zone which is cooled by water circulated through a water jacket 23 surrounding and enclosing the outer walls of the ledge 21 and the wall section 9. While the support ledge 21 is shown to be downwardly and inwardly inclined in the drawings, it may be disposed in a horizontal plane or inclined downwardly preferably at an angle of from 0° to 45° from the horizontal depending upon the dimensions of the passage in the stack 17, the size of the circular opening 13 in relation to the size of the stack opening, and as required for supporting and controlling the rate of descent of the column of vehicles in the stack. The wall section 9 which joins and supports the ledge 21, is preferably arranged to be at an angle of about 60° from the horizontal. It is to be understood, of course, that the stack furnace also includes all of the conventional and necessary structural features required even though they are not shown.

The structure described thus far is substantially shown in my patent mentioned above. Vehicles or pairs of vehicles compressed together to form charge units are inserted into the upper end of the stack and the lowermost vehicle or charge unit rests on the support ledge 21 with the other vehicles or charge units disposed one upon another in a column in the stack. The opening 13 is arranged to be smaller in diameter than the transverse dimension of the scrap vehicles or charge units descending through the stack 17 so that they will be progressively melted while resting on the ledge 21.

From time to time during furnace operation, unmelted portions of the lowermost vehicle or charge unit resting on the support ledge 21 become lodged or hung up in such a manner that they obstruct the descent of the vehicles located thereabove or otherwise reduce the efficient operation of the furnace. The present invention relates to apparatus for removing unmelted scrap metal or other material from the supporting ledge 21 and for feeding scrap material inwardly of the furnace wall into the hottest area of the combustion zone for melting, thereby improving the efficiency of the scrap melting process.

In a preferred form of the invention, four rectangular-shaped openings 25 are formed in the furnace wall immediately above the upper surface of the support ledge 21. These openings 25 are equally spaced around the periphery of the furnace wall and the lower edge of the openings lies substantially in the plane of the upper surface of the support ledge 21.

Within each of the four rectangular openings 25, there is provided a generally rectangular-shaped metal lining, the bottom wall being formed by an outwardly extending portion of the support ledge 21. The side walls 35 and 37 of the openings are formed by steel plates extending inwardly from the shell 3 to the inner periphery of the stack lining 19 while the top walls 39 may be an inward extension of the furnace shell 3 terminating at the inner surface of the insulating brick 19. The top walls 39 of the openings are preferably arranged to be substantially parallel to the upper surface of the support ledge 21, whatever its angle to the horizontal may be.

A power operated pusher device generally designated 40, is positioned so as to operate through each of the rectangular openings 25 and, since all of the pusher devices are of the same construction and arranged to operate in the same manner, only one will be described in detail.

Within the walls of each of the openings 25, there is snugly fitted an elongated, heavy gauge, metal casing 41 of generally rectangular configuration. Each of the rectangular casings 41 includes a top wall 47, a bottom wall 49, and side walls 51 and 53. The inner end 55 of each casing 41 is open and unobstructed and the inner end of the top wall 47 is formed to be arcuate so as to conform to and terminate substantially flush with the inner surface of the refractory brick lining 19. The inner end of the bottom wall 49 conforms to the periphery of the support ledge 21 and is welded in abutment therewith as at 49a, the upper surface of the ledge and of the bottom wall lying in a common plane.

In order to rigidly mount the casings 41 on the furnace and to prevent furnace gases from escaping around the casings, the metal walls of the casings 41 are welded as at 56 to the adjacent surface of the furnace shell 3 and to the upper wall 57 of the water jacket 23. The outer end of each of the casings 41 is open and the casings extend a suitable distance outwardly beyond the steel shell 3 of the furnace and terminate in an outwardly extending annular flange 58.

Figure 3:
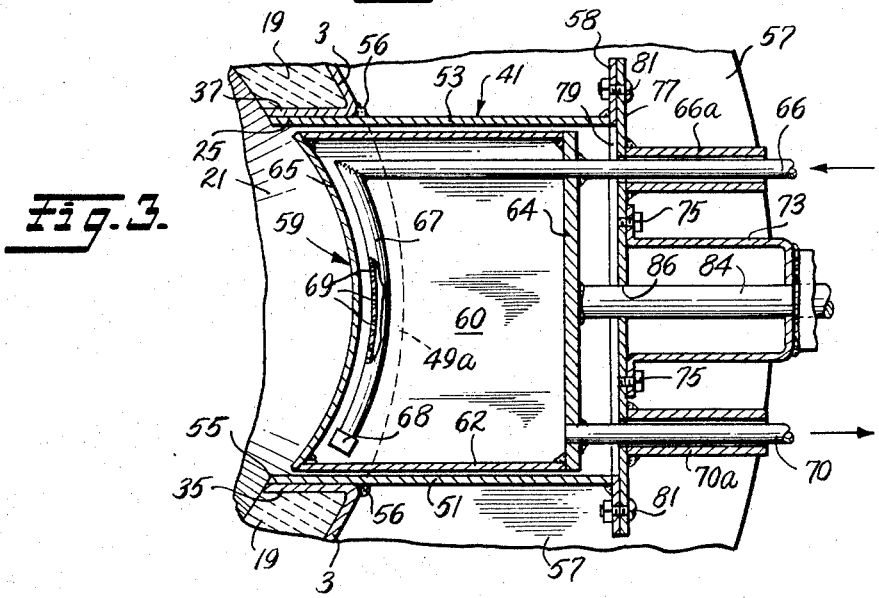
FIG. 3 is an enlarged, fragmentary, horizontal, sectional view taken on the line 3—3 of FIG. 2.

Slidably mounted within each of the casings 41 is a closed, water-cooled pusher head 59 of generally rectangular shape fabricated of heavy, heat-resistant metal plates welded together to form a water-tight receptacle as best shown in FIG. 3. Each pusher head 59 includes a bottom wall 60, a top wall 61, side walls 62 and 63, an outer end wall 64, and an arcuate inner end wall 65 having a radius substantially the same as that of the opening 13.

Each pusher head 59 is cooled by water or other cooling fluid supplied under pressure through a flexible hose and rigid feed pipe 66. The pipes 66 are preferably formed with an extra heavy wall and extend into the respective pusher head through the outer end wall 64 parallel to and adjacent the side wall 63 to a point adjacent one end of the inner end wall 65 where they are each connected with a curved spray pipe 67 positioned closely adjacent and parallel to the curved inner surfaces of the inner end wall 65. The end of each spray pipe 67, remote from its feed pipe 66, is closed by a cap 68 and the surface of each spray pipe 67 facing the inner end wall 65 is provided throughout its length with one or more rows of perforations 69 through which water or other cooling fluid may be sprayed or jetted against the inner surface of the adjacent inner end wall 65 to cool it and prevent damage thereto during operation of the furnace. The cooling fluid after impinging against the inner end wall 65, flows out of each pusher head through a heavy wall drain pipe 70 and flexible hose connected therewith. Both the feed pipe 66 and the drain pipe 70 are rigidly secured in the outer end wall 64 of each pusher head by suitable welds and extend outwardly a suitable distance through openings provided in the mounting plate 77.

The pusher heads 59 are of such a size as to slide freely within the casings 41 from a retracted position wherein the inner end wall 65 lies a short distance within the inner end of the casing 41 to an extended position wherein the inner end wall 65 lies in substantial vertical alignment with the inner edge 11 of the circular restricted opening 13.

The pusher heads 59 are each preferably moved radially of the furnace between the retracted and the projected position by a reciprocating fluid motor 71. Each of the fluid motors 71 is mounted on a generally U-shaped bracket 73 bolted at 75 near the center of the outer surface of a heavy metal plate 77 which closes the outer open end 79 of the casing 41 on which it is mounted. Each metal mounting plate 77 is fastened to the flange 58 of the respective casing 41 by the bolts 81.

The fluid motors 71 are of conventional construction and each includes a piston 82 reciprocating in a cylinder 83 and a piston rod 84 extending from the piston through one end of the cylinder and through a bearing opening 86 formed in the respective mounting plate 77. The free end of the piston rods 84 are welded or otherwise fixedly secured to the center of the outer surface of the outer end wall 64 of the corresponding pusher head. Additional guide means for each of the pusher heads 59 is provided by bearing means 66a and 70a shown in the form of heavy metal tubing closely surrounding the outwardly extending portion of the feed pipe 66 and the drain pipe 70, respectively, and welded to the outer surface of the mounting plate 77 concentric with the corresponding pipe. Although not shown, the guide tubing 66a and 70a, as well as the bearing opening, may be provided with a lining or insert of suitable bearing material. In order to support the fluid motors 71 in fixed position on the furnace, a heavy metal bracket or brace 72 is welded at one end to the steel shell 3 and bolted at 72a at the other end to the cylinder 83 of each of the fluid motors.

Suitable connections 85 and 87 are provided at each end of the fluid motors 71 for supplying operating fluid under pressure to opposite ends of the pistons and for draining the operating fluid from the cylinders. Fluid under pressure for operating the fluid motors 71 may be supplied from any source, not shown, and preferably is furnished from the same source as that which supplies the fluid motors employed for collapsing or squeezing the scrap vehicles (see my Patent 3,367,769) to form charge units before they are inserted into the stack of the furnace.

Since each of the pushers is preferably operable independently of each of the other pushers, a 4-way control valve 89 of the conventional construction is provided for each fluid motor. The operating fluid directed to each control valve 89 is furnished through a flexible conduit 91 and is drained to sump through a flexible conduit 93. The lines 95 and 97 connect the valves 89 with the connections 85 and 87 at either end of the fluid motors. Each of the control valves 89 is arranged to connect either end of its fluid motor to fluid under pressure while at the same time connecting the other end to sump as well as to simultaneously shut off both ends of the fluid motor from both fluid under pressure and from the sump. By suitably operating the valves 89, either manually or by suitable automatic control means, the fluid motors connected therewith may be reciprocated or maintained in any selected position for moving the corresponding pusher head between the retracted and projected positions or holding it in any selected intermediate position. All of the pusher heads may thus be moved inwardly or outwardly at the same time, if desired, or they may be actuated in any combination or moved one at a time as conditions indicate in order to maintain the operation of the furnace at maximum efficiency.

Figure 2:
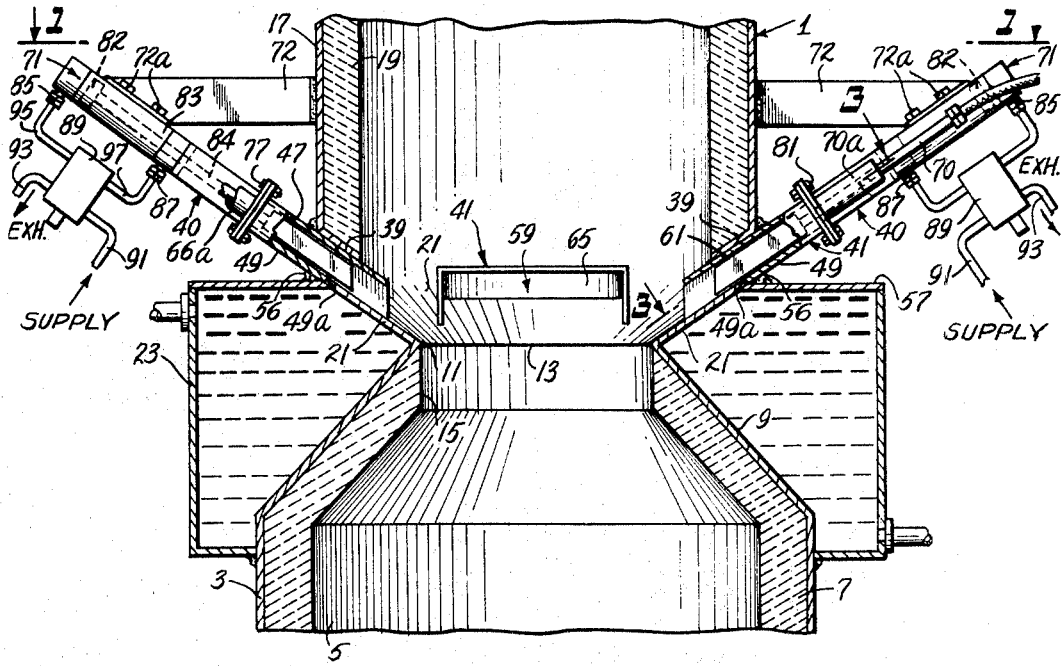
FIG. 2 is a fragmentary, staggered, vertical, sectional view taken on the line 2—2 of FIG. 1.

As shown in FIGS. 1–3, the side walls 62 and 63 of the pusher heads 59 are planar from end to end so that when all of the pusher heads are in the projected position, there is a generally triangular-shaped surface of the support ledge between the side walls of adjacent pusher heads which is not covered. Thus, unmelted scrap hung up on these triangular surfaces would not be engaged by the pusher heads and forced inwardly into the combustion zone. This situation may be eliminated as shown in FIG. 5 by providing triangular-shaped pyramids 103 on the upper surface of the support ledge 21 in the areas not covered by the pusher heads 59 for directing or deflecting unmelted scrap metal into the path of travel of one of the adjacent pusher heads.

In the modified form of the pusher heads shown in FIG. 4, each of the heads 59 includes parallel side wall portions 105 and 107 having inner end portions 109 and 111, respectively, converging at an angle of substantially 135° with respect to the corresponding side wall. The inner end portions 109 and 111 are substantially as long as the radial width of the support ledge 21 and the width of each of the pusher heads 59 between the parallel side wall portions 105 and 107 is arranged to be such that when adjacent pusher heads are in the projected position with the inner end wall 115 in vertical alignment with the inner edge 11 of the circular opening 13, the inner end wall portions 109 and 111 of adjacent pusher heads will be contiguous. With this arrangement, the four pusher heads 59 are adapted to traverse all of the surface of the support ledge 21 and the triangular-shaped pyramids 103 shown in FIG. 5 and referred to above, will not be required. Obviously, more or fewer than the four pusher heads shown herein may be employed according to varying requirements and circumstances and power operated means other than fluid motors may be connected with the pusher heads for reciprocating them. The structure and arrangement of parts disclosed herein are for the purpose of illustrating my invention and others skilled in the art will conceive other obvious modifications of the invention.

In the event that it becomes necessary or desirable to remove a pusher head, whether or not the furnace is in operation, the unit, including the pusher head 59, pipes 66 and 70, fluid motor 71, bracket 73, and mounting plate 77, may be removed from the furnace by releasing the bracket bolts 72a and the flange bolts 81 and withdrawing the head 59 from the casing 41. The open outer end 79 of the casing would then be immediately closed by an imperforate plate, not shown, similar to the plate 77, secured to the flange 58. The flexible hoses connected with the fluid motors and with the cooled pusher heads are adapted to permit removal and replacement of pusher heads without necessarily being disconnected.

What I claim is:

1. In a stack furnace, suitable for melting whole scrap vehicles, having a combustion chamber; a vertical stack having an opening therein of a size to permit whole scrap vehicles to be melted to descend freely therethrough disposed above said combustion chamber; and support means mounted on said furnace in the combustion zone thereof and extending inwardly from the wall of the furnace into the passage formed by the walls of said stack and said combustion chamber partially obstructing said passage for engaging and supporting the lowermost scrap vehicle in the stack until it is at least partially melted; the improvement comprising power operated pushing means disposed immediately above the upper surface of said support means and movable across the upper surface of said support means between the outer and the inner edge thereof for pushing unmelted scrap material resting on said support means inwardly thereof and into the melting zone of the furnace.

2. A stack furnace according to claim 1 in which said support means is generally annular and forms a ring-like restriction in said passage; and said power operated pushing means comprises a plurality of pusher heads spaced apart around the periphery of said support means; and power actuated means operably connected with each of said pusher heads.

3. A stack furnace according to claim 2 in which the upper surface of said support means extends inwardly and downwardly from the furnace wall at an angle of between 0 and 45 degrees to the horizontal and said pusher heads move substantially parallel to the upper surface of the support ring.

4. A stack furnace according to claim 1 wherein said support means is generally annular and forms a ring-like restriction in said passage; said power operated pushing means comprises a plurality of pusher heads disposed around the periphery of said support means and slidably mounted generally radially of said passage for movement between a retracted and a projected position in corresponding openings formed in the furnace wall, and power actuated means is operably connected with each of said pusher heads for moving each of them across a section of said support means.

5. A stack furnace according to claim 4 wherein triangular-shaped pyramid members are rigidly fixed on the upper surface of said support member between adjacent pusher heads on the sections of the support means not swept across by said pusher heads for deflecting descending scrap material into the path of travel of an adjacent pusher head.

6. A stack furnace according to claim 4 wherein said power actuated means comprises a double acting, reciprocating fluid motor operably connected with each pusher head and disposed outside the furnace wall.

7. A stack furnace according to claim 4 wherein each of said pusher heads includes means for circulating a cooling fluid therethrough, for cooling said pusher heads.

8. A stack furnace according to claim 4 wherein each of said pusher heads comprises a closed, fluid tight receptacle, means connected with said receptacle for conducting a coolant fluid to the interior thereof and means connected with said receptacle for draining said coolant fluid therefrom.

9. A stack furnace according to claim 8 wherein each of said coolant fluid conducting means terminates adjacent the inner wall of the corresponding pusher head and is formed with a plurality of spray openings facing said inner wall for the passage of coolant fluid.

10. A stack furnace according to claim 9 wherein said conducting means and said draining means of each of said pusher heads comprise heavy metal pipe extending outwardly from and fixed in parallel relationship rigid with the outer wall of the respective pusher head, and guide means is rigidly mounted on said furnace and closely surrounds the heavy metal pipe of each of said conducting means and said draining means for guiding said pusher heads during movement between the retracted and projected positions.

11. A stack furnace according to claim 1 wherein said support means is substantially annular and said furnace is formed with a plurality of openings around and immediately above the upper surface of said support means; and an open ended casing is fixedly mounted in each of said openings and said power operated pushing means comprises a pusher head slidably mounted in each of said casings for movement between a retracted position with its inner end wall substantially in vertical alignment with the adjacent inner surface of the furnaue lining and an extended position wherein the inner end wall is in substantially vertical alignment with the inner edge of said support means; closure plate means rigidly mounted on the outer end of each of said casings; and a power actuated means mounted on each of said closure plate means and operably connected with the respective pusher head for moving it between the retracted and the projected position.

12. A stack furnace according to claim 11 wherein each of said pusher heads includes means for circulating a cooling fluid therethrough for cooling said pusher heads.

13. A stack furnace according to claim 11 wherein said power actuated means comprises an independent, double acting, reciprocating fluid motor operably connected with each of said pusher heads.

14. A stack furnace according to claim 11 wherein the upper surface of said support means extends inwardly and downwardly from the furnace wall at an angle of between 0 and 45 degrees to the horizontal and all of said pusher heads together traverse substantially the entire upper surface of said support means when they are moved from the retracted to the projected position.

References Cited

UNITED STATES PATENTS

| | | | |
|---|---|---|---|
| 766,903 | 8/1904 | Ronay | 266—24 |
| 1,138,501 | 5/1915 | Nelson | 214—23 |
| 1,761,229 | 6/1930 | Pederson | 214—23 |
| 2,524,476 | 10/1950 | Richardson | 266—27 X |
| 3,367,769 | 2/1968 | Schott | 266—33 X |

J. SPENCER OVERHOLSER, Primary Examiner

R. S. ANNEAR, Assistant Examiner

U.S. Cl. X.R.

214—24; 266—33